(12) United States Patent
Masuda

(10) Patent No.: US 11,708,116 B2
(45) Date of Patent: Jul. 25, 2023

(54) WORK VEHICLE

(71) Applicant: KUBOTA CORPORATION, Osaka (JP)

(72) Inventor: Ryo Masuda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 8 days.

(21) Appl. No.: 17/026,913

(22) Filed: Sep. 21, 2020

(65) Prior Publication Data

US 2021/0094619 A1 Apr. 1, 2021

(30) Foreign Application Priority Data

Sep. 27, 2019 (JP) ................. 2019-176531

(51) Int. Cl.
*B62D 25/12* (2006.01)

(52) U.S. Cl.
CPC ........ *B62D 25/12* (2013.01); *B60Y 2200/221* (2013.01)

(58) Field of Classification Search
CPC ...... B62D 25/12; B62D 25/084; B62D 49/00; B60Y 2200/221
See application file for complete search history.

(56) References Cited

U.S. PATENT DOCUMENTS

| | | | | |
|---|---|---|---|---|
| 2,715,448 A * | 8/1955 | Zeeb | ................... | B62D 25/084 180/68.4 |
| 3,987,766 A * | 10/1976 | Welck | ..................... | F01P 1/02 123/41.66 |
| 5,042,604 A * | 8/1991 | Tone | ...................... | B60K 11/04 180/68.4 |
| 5,199,521 A * | 4/1993 | Samejima | .............. | B60K 11/04 180/68.1 |
| 6,068,675 A * | 5/2000 | Tsuda | ..................... | B62D 25/10 123/198 E |
| 6,880,882 B2 * | 4/2005 | Andre | .................. | B62D 25/084 293/115 |
| 7,418,994 B2 * | 9/2008 | Evans | .................... | B60K 11/02 123/41.49 |

(Continued)

FOREIGN PATENT DOCUMENTS

| | | |
|---|---|---|
| EP | 0 906 863 A2 | 4/1999 |
| EP | 2 228 286 A1 | 9/2010 |

(Continued)

OTHER PUBLICATIONS

The Extended European search report issued in European Patent Application No. 20198054.7 dated Feb. 23, 2021.

(Continued)

*Primary Examiner* — Paul N Dickson
*Assistant Examiner* — Timothy Wilhelm
(74) *Attorney, Agent, or Firm* — Greenblum & Bernstein, P.L.C.

(57) ABSTRACT

A work vehicle in which deformation of a shield member can be suppressed. The work vehicle includes: a hood that can be opened and closed; a lower shield portion that is fixed to an inside of the hood; and an upper shield portion that is fixed to an inner peripheral face of the hood and, when the hood is closed, comes in contact with the lower shield portion to partition an inner space of the hood together with the lower shield portion.

9 Claims, 8 Drawing Sheets

(56) References Cited

U.S. PATENT DOCUMENTS

| | | | |
|---|---|---|---|
| 8,276,699 B2* | 10/2012 | Elhardt | B62D 25/084 180/68.6 |
| 9,162,641 B2* | 10/2015 | Townson | B62D 25/084 |
| 9,499,045 B2* | 11/2016 | Sawai | B60K 13/04 |
| 9,580,112 B2* | 2/2017 | Shoen | B60K 13/02 |
| 9,914,487 B2* | 3/2018 | Matsumoto | B60R 19/44 |
| 10,287,962 B2* | 5/2019 | Kurokawa | F02B 29/0431 |
| 2004/0216934 A1 | 11/2004 | Tomiyama et al. | |
| 2005/0274491 A1 | 12/2005 | Evans et al. | |
| 2011/0272202 A1 | 11/2011 | Kawashiri et al. | |
| 2015/0217634 A1 | 8/2015 | Sawai et al. | |
| 2016/0031486 A1 | 2/2016 | Shoen | |
| 2020/0156708 A1* | 5/2020 | Saeki | E05F 5/022 |

FOREIGN PATENT DOCUMENTS

| | | |
|---|---|---|
| EP | 2 610 147 A2 | 7/2013 |
| JP | S56-84422 | 7/1981 |
| JP | H11-78987 | 3/1999 |
| JP | H1191371 A * | 4/1999 |
| JP | 2004-224307 | 8/2004 |
| JP | 2010-159028 A | 7/2010 |

OTHER PUBLICATIONS

Office Action issued in Corresponding JP Patent Application No. 2019-176531, dated Oct. 4, 2022, along with an English translation thereof.

* cited by examiner

WORK VEHICLE

TECHNICAL FIELD

The disclosure relates to a technique of a work vehicle including a shield portion that partitions an inner space of a hood.

BACKGROUND ART

Conventionally, there is a known technique of a work vehicle including a shield portion that partitions an inner space of a hood. For example, such a technique is described in JP 2010-159028 A, for example.

A tractor (work vehicle) described in JP 2010-159028 A includes an engine, a radiator, a cooling fan, and the like disposed in a hood that can be opened and closed. The cooling fan is disposed inside a shroud of the radiator. In the tractor, the cooling fan driven for rotation by the engine draws in air from a front side to a rear side of the radiator. The air cools the radiator.

On an inner peripheral face of the hood of the tractor, a seal member (shield portion) is provided. The seal member is pinched between the radiator (shroud) and the hood to be disposed to fill a clearance between the radiator and the hood (to come in contact with the shroud) when the hood is closed.

With this seal member, it is possible to partition a space in the hood into front and rear spaces (on the front and rear sides of the radiator). Thus, it is possible to guide the air in the space on the front side of the radiator (the air at a relatively low temperature) such that the air passes through the radiator. Moreover, it is possible to prevent the air in the space on the rear side of the radiator (the air at a relatively high temperature) from flowing into the space on the front side of the radiator again. Thus, it is possible to effectively cool the radiator.

However, there is still room for improvement of the seal member described in JP 2010-159028 A, because the seal member may be deformed while used for a long time.

SUMMARY OF INVENTION

The disclosure has been made with the above-described circumstances in view and the object of the disclosure is to provide a work vehicle in which deformation of a shield member can be suppressed.

The problem to be solved by the disclosure is as described above and a solution to the problem will be described next.

In other words, a work vehicle according to the disclosure includes: a hood that can be opened and closed; a first shield portion that is fixed to an inside of the hood; and a second shield portion that is fixed to an inner peripheral face of the hood and comes in contact with the first shield portion to partition an inner space of the hood together with the first shield portion when the hood is closed.

In the work vehicle according to the disclosure, recesses through which a hose connected to an air cleaner is disposed are respectively formed in a first contact face at which the first shield portion comes in contact with the second shield portion and a second contact face at which the second shield portion comes in contact with the first shield portion.

In the work vehicle according to the disclosure, the first shield portion is fixed to an upper face of a radiator, the upper face of the radiator includes a first plane portion and a second plane portion formed at a lower position than the first plane portion, and the recesses are formed above the first plane portion.

In the work vehicle according to the disclosure, an upper face of the first shield portion has a portion positioned above the second plane portion that is lower than a portion positioned above the first plane portion.

In the work vehicle according to the disclosure, the first shield portion is formed in a substantially trapezoidal shape with a left-right width between paired left and right sides narrowing from a lower side toward the upper face.

In the work vehicle according to the disclosure, the first shield portion is fixed to the upper face of the radiator, an upper portion of the radiator is formed in a substantially trapezoidal shape with a left-right width between paired left and right sides narrowing from a lower side toward the upper face, and the paired left and right sides of the first shield portion are formed along extended lines of the paired left and right sides of the upper portion of the radiator.

As effects of the disclosure, the disclosure exerts the following effects.

In the work vehicle according to the disclosure, it is possible to suppress deformation of the shield portions (the first shield portion and the second shield portion).

In the work vehicle according to the disclosure, it is possible to suppress the deformation of the first shield portion.

DESCRIPTION OF EMBODIMENT

In the following description, directions shown by arrows U, D, F, B, L, and R in the figures are defined as upward, downward, forward, backward, leftward, and rightward directions, respectively.

Figure 1:
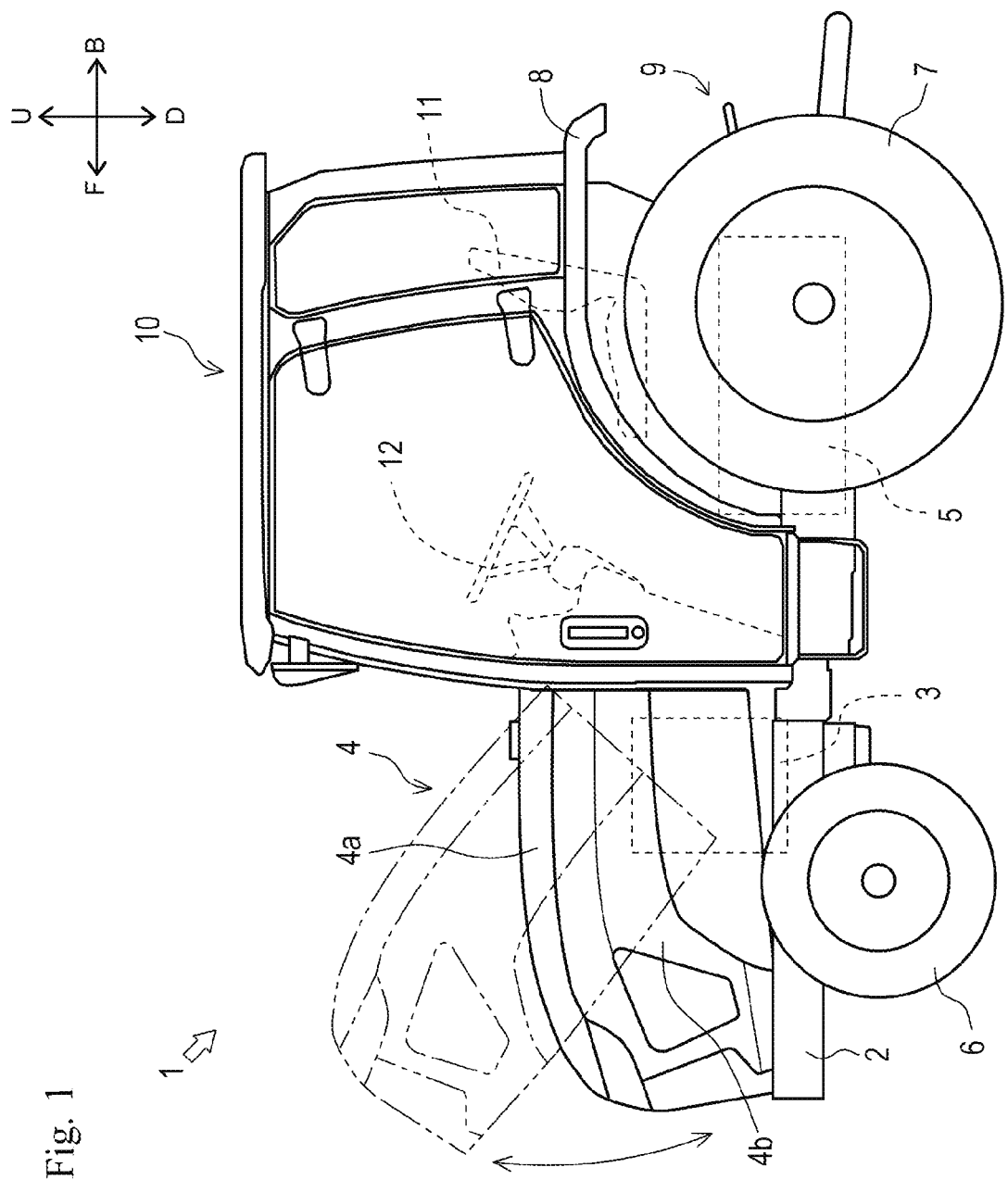
FIG. 1 is a left side view of an overall configuration of a tractor according to an embodiment of the disclosure.

First, an overall configuration of a tractor 1 according to an embodiment of a work vehicle according to the disclosure will be described with reference to FIG. 1.

The tractor 1 mainly includes a body frame 2, an engine 3, a hood 4, a transmission case 5, front wheels 6, rear wheels 7, fenders 8, a lift 9, a cabin 10, a seat 11, a steering wheel 12, and the like.

The body frame 2 is a frame-shaped member formed by appropriately combining a plurality of panel members. The body frame 2 is formed in a substantially rectangular shape in plan view. The body frame 2 is provided to a front portion of the tractor 1 with a longitudinal direction oriented in a front-back direction. The engine 3 is disposed at a rear portion of the body frame 2 and covered with the hood 4. The hood 4 has a top panel 4a disposed above the engine 3, side panels 4b disposed on left and right outer sides of the engine 3, and the like and is provided vertically rotatably about a rear end portion (to be able to be opened and closed). The transmission case 5 is fixed to a rear portion of the engine 3.

A front portion of the body frame 2 is supported by the pair of left and right front wheels 6 with a front axle mechanism (not shown) interposed therebetween. A rear portion of the transmission case 5 is supported by the pair of left and right rear wheels 7 with a rear axle mechanism (not shown) interposed therebetween. The paired left and right rear wheels 7 are covered with the fenders 8 approximately from above.

The lift 9 is provided to the rear portion of the transmission case 5. Various work implements (e.g., a cultivator and the like) can be attached to the lift 9. The lift 9 can raise and lower the attached work implement with actuators such as hydraulic cylinders. It is possible to transmit power of the engine 3 to the lift 9 via a PTO (Power Takeoff) shaft (not shown).

The power of the engine 3 is changed in speed by a transmission (not shown) housed in the transmission case 5 and then can be transmitted to the front wheels 6 via the front axle mechanism and can be transmitted to the rear wheels 7 via the rear axle mechanism. The power of the engine 3 drives the front wheels 6 and the rear wheels 7 for rotation to thereby allow the tractor 1 to travel. The power of the engine 3 can drive the work implement attached to the lift 9.

The cabin 10 is provided behind the engine 3. Inside the cabin 10, a living space which an operator gets into is formed. The seat 11 in which the operator sits is disposed substantially at the center of the cabin 10. In a front portion of the cabin 10, the steering wheel 12 for adjusting a steering angle of the front wheels 6 is disposed. An air-conditioning unit (not shown) for sending conditioned air into the living space is provided to the cabin 10.

A layout of respective members in the hood 4 will be described below with reference to FIGS. 2 to 4.

In the hood 4, the engine 3, a battery 21, straightening plates 22, a radiator 50, an upper hose 24, a lower hose 25, a partition member 60, an air cleaner 30, an inlet hose 31, an outlet hose 32, a DPF (Diesel Particulate Filter) 42, a muffler 43, an alternator 45, a compressor 46, a fuel tank 47, and the like are disposed.

Figure 2:
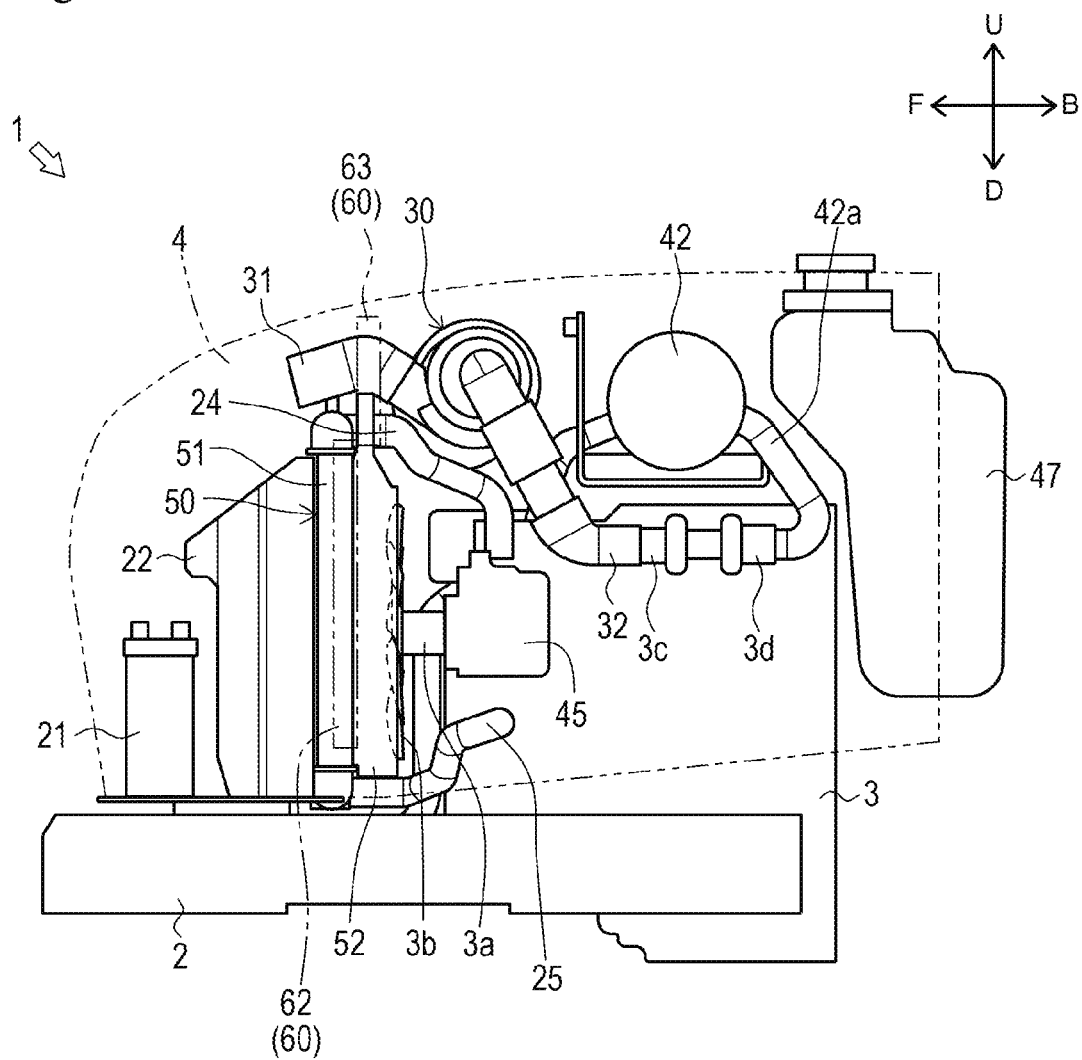
FIG. 2 is a left side view of a configuration in the vicinity of a hood.
Figure 3:
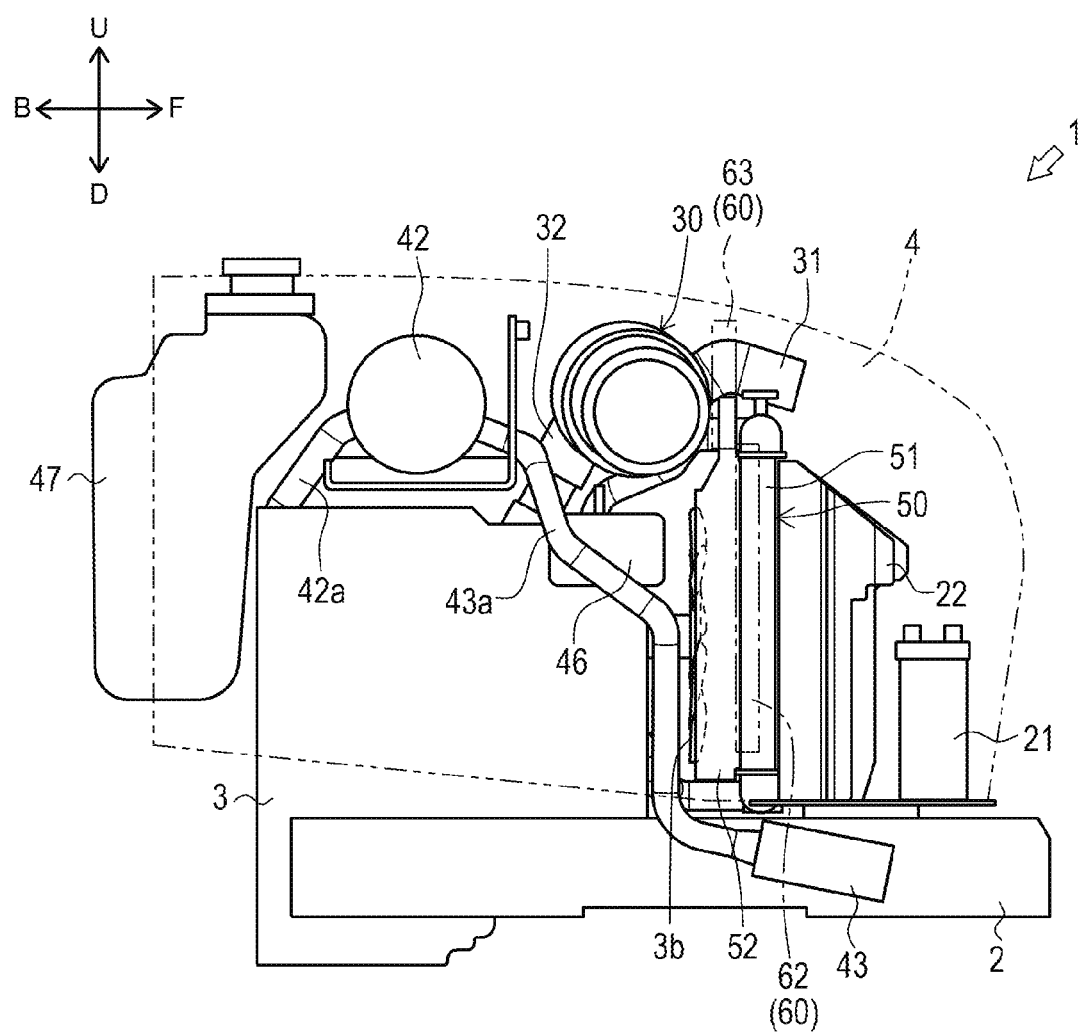
FIG. 3 is a right side view of the configuration in the hood.

The engine 3 shown in FIGS. 2 and 3 is disposed in a rear portion of the hood 4 and supported on the body frame 2. The engine 3 has a shaft 3a, a fan 3b, an intake port 3c, and an exhaust port 3d.

The shaft 3a is for transmitting the power to the fan 3b (described later). The shaft 3a protrudes forward from the engine 3.

The fan 3b sends the air backward. The fan 3b is disposed behind a core 51 of the radiator 50 (described later) to face the core 51. The fan 3b is driven by the power transmitted from the engine 3 via the shaft 3a and the like.

The intake port 3c is for drawing in the outside air. The exhaust port 3d is for emitting exhaust gas. The intake port 3c and the exhaust port 3d are formed on a left side of the engine 3.

The battery 21 is for feeding electric power to devices to be powered in the tractor 1 (e.g., the air conditioner and a work light). The battery 21 is disposed in a front portion of the hood 4.

The straightening plates 22 are for straightening a flow of air in the hood 4. The straightening plates 22 are formed in substantially rectangular shapes in side view. The pair of left and right straightening plates 22 is provided. The straightening plates 22 are disposed on a rear side of the battery 21.

The radiator 50 is for cooling cooling water for the engine 3. The radiator 50 is disposed immediately behind the straightening plates 22. The radiator 50 has the core 51 and a shroud 52.

The core 51 is for exchanging heat between the cooling water for the engine 3 and the air flowing in the hood 4. The core 51 is disposed at a front portion of the radiator 50.

The shroud 52 is for leading the air to the fan 3b. The shroud 52 is disposed at a rear portion of the radiator 50. The shroud 52 is formed to cover the fan 3b of the engine 3 from an outer peripheral side. The shroud 52 will be described later in detail.

The radiator 50 formed as described above cools the cooling water when the fan 3b of the engine 3 is driven. To put it concretely, when the fan 3b is driven, the air on a front side of the core 51 of the radiator 50 (the air flowing in the hood 4) is drawn in and passes through the core 51. The radiator 50 exchanges the heat between the air and the cooling water to cool the cooling water. The fan 3b sends the air backward after the heat exchange.

The upper hose 24 shown in FIG. 2 leads the cooling water from the engine 3 to the core 51. The upper hose 24 is connected to an upper end portion of the core 51 and a front portion of the engine 3.

The lower hose 25 leads the cooling water from the core 51 to the engine 3. The lower hose 25 is connected to a lower end portion of the core 51 and the front portion (below the portion connected to the upper hose 24) of the engine 3.

Figure 4:
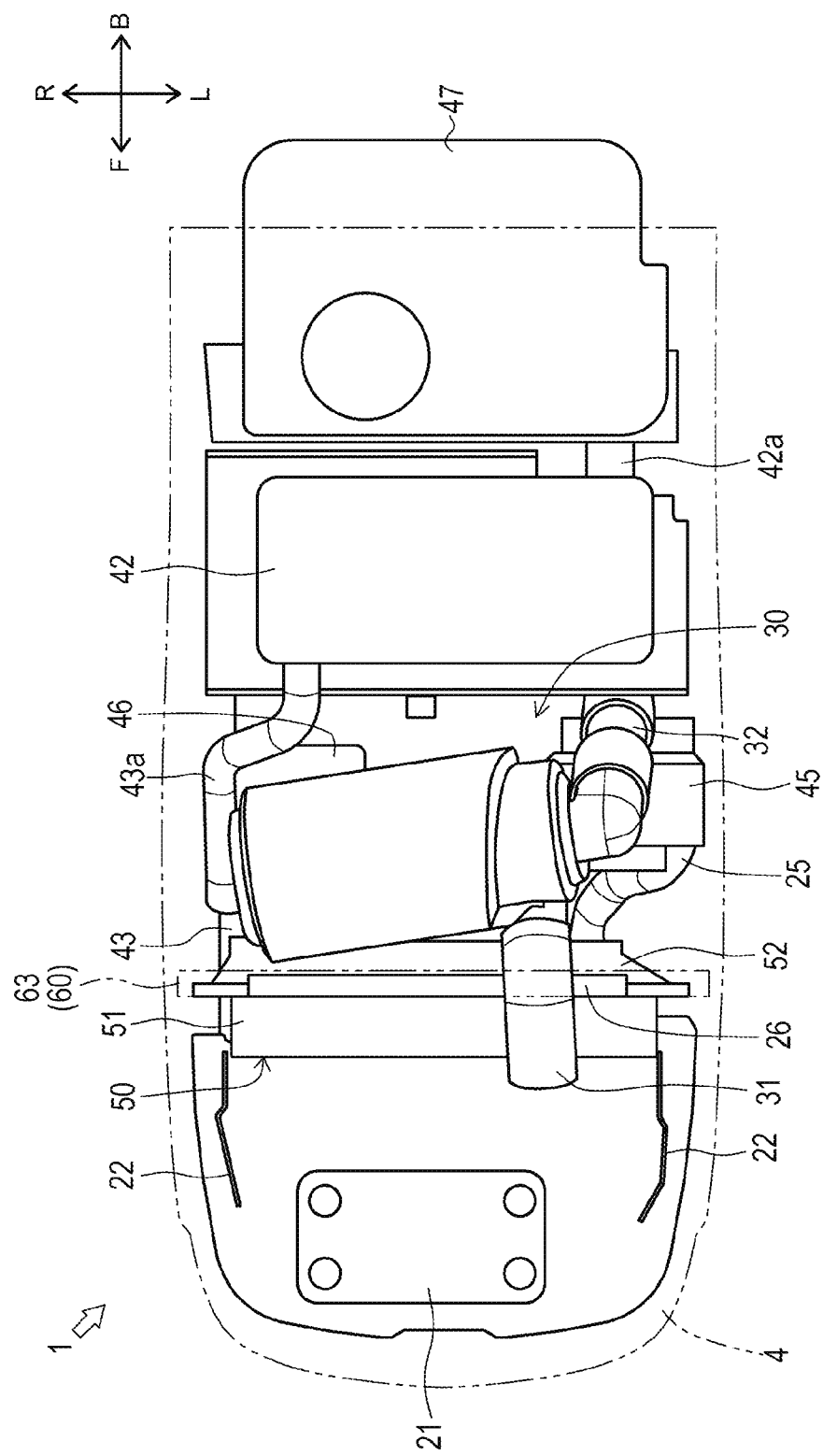
FIG. 4 is a plan view of the configuration in the hood.

The partition member 60 shown in FIGS. 2 to 4 partitions an inner space of the hood 4 into front and rear spaces. The partition member 60 mainly includes a lower shield portion 61, side shield portions 62, and an upper shield portion 63. The partition member 60 will be described later in detail.

The air cleaner 30 is for cleaning the air and sending the air to the engine 3. The air cleaner 30 is formed in a substantially circular columnar shape with an axial direction oriented substantially in a left-right direction. The air cleaner 30 is disposed behind the radiator 50 and above the engine 3.

The inlet hose 31 is for leading the air on the front side of the radiator 50 into the air cleaner 30. A rear end portion of the inlet hose 31 is connected to the air cleaner 30. The inlet hose 31 is disposed astride and above the radiator 50 in the front-rear direction. A front end portion of the inlet hose 31 is disposed on the front side of the radiator 50.

The outlet hose 32 is for leading the air cleaned by the air cleaner 30 to the engine 3. An end of the outlet hose 32 is connected to the air cleaner 30. The other end of the outlet hose 32 is connected to the intake port 3c of the engine 3.

The DPF 42 is for collecting PM (Particulate Matter) in the exhaust gas emitted from the engine 3. The DPF 42 is formed in a substantially circular columnar shape with an axial direction oriented in the left-right direction. In the DPF 42, a filter or the like for collecting the PM is provided. The DPF 42 is disposed behind the air cleaner 30 and above the engine 3. The DPF 42 is connected to the exhaust port 3d of the engine 3 by an introduction pipe 42a and the exhaust gas is introduced into the DPF 42 from the engine 3.

The muffler 43 shown in FIG. 3 is for emitting the exhaust gas outside. The muffler 43 is connected to the DPF 42 by an emission pipe 43a. The muffler 43 leads the exhaust gas (the exhaust gas after the collection of the PM) from the DPF 42 forward and downward and emits the exhaust gas outside under the right straightening plate 22.

The alternator 45 shown in FIGS. 2 and 4 is a device (electric generator) that generates electric power by use of the power from the engine 3. The alternator 45 is disposed behind the radiator 50 and on the left side of the engine 3.

The compressor 46 shown in FIGS. 3 and 4 is for compressing refrigerant of the air-conditioning unit for the cabin 10 by use of the power from the engine 3. The compressor 46 is disposed behind the radiator 50 and on a right side of the engine 3.

The fuel tank 47 is a hollow member for storing fuel. The fuel tank 47 is disposed behind the engine 3 and the DPF 42.

With reference to FIGS. 5 to 8, the radiator 50 (and especially the shroud 52) and the partition member 60 disposed in the vicinity of the radiator 50 will be described below.

As described above, the radiator 50 mainly includes the core 51 and the shroud 52. The shroud 52 is disposed behind the core 51.

Figure 6:
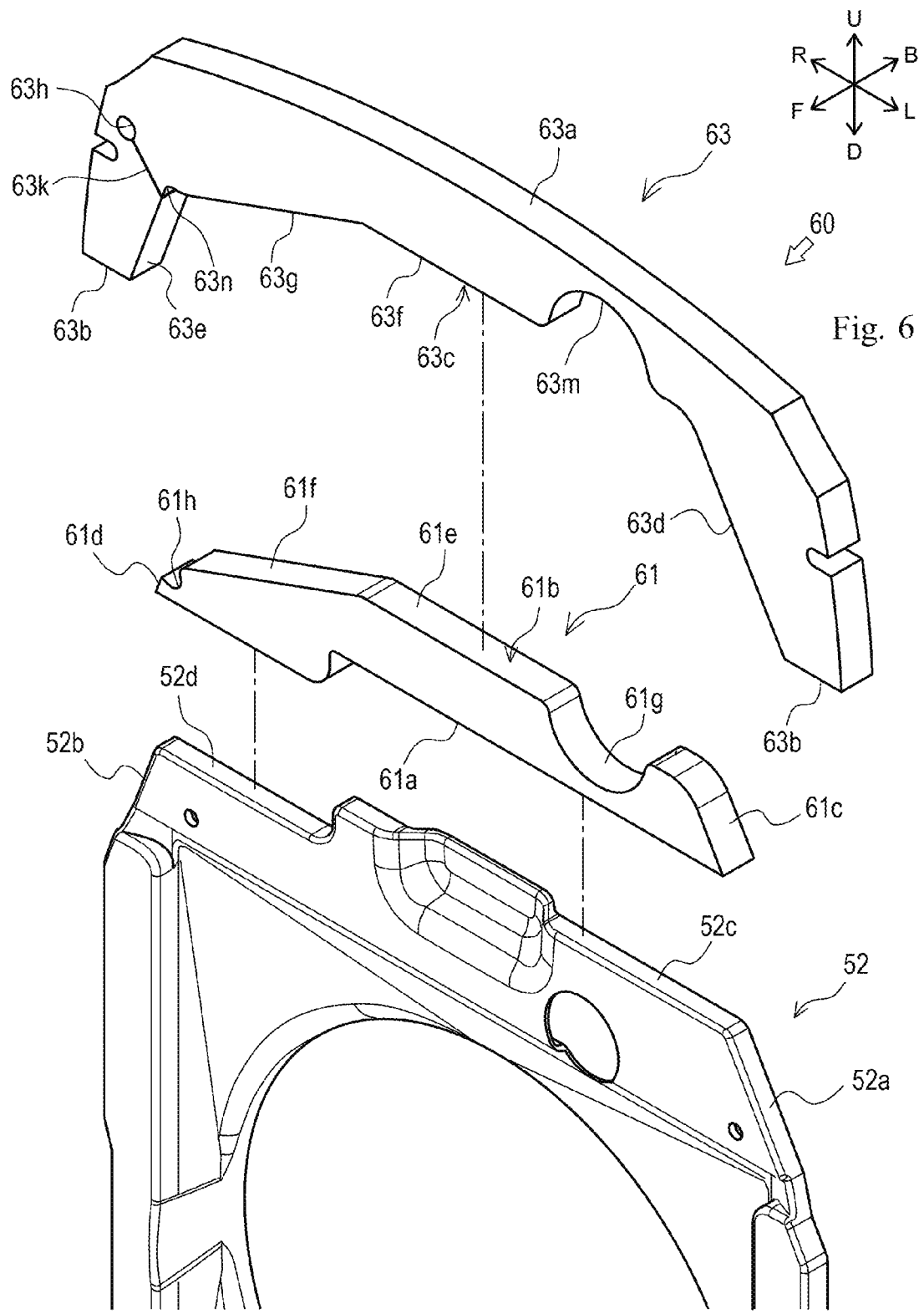
FIG. 6 is an exploded perspective view of a shroud, a lower shield portion, and an upper shield portion.
Figure 7:
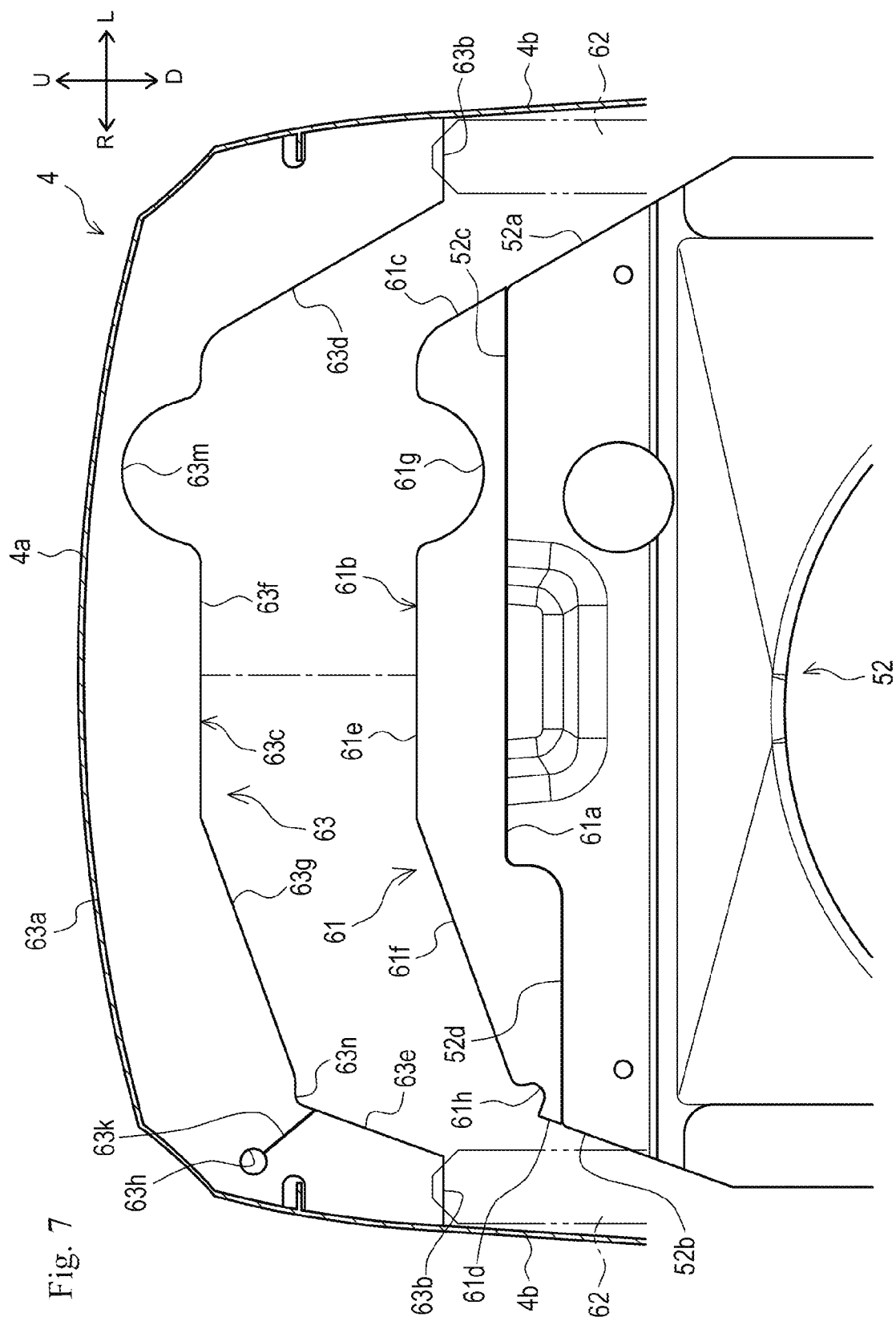
FIG. 7 is a partially sectional front view of the partition member when the hood is open.
Figure 8:
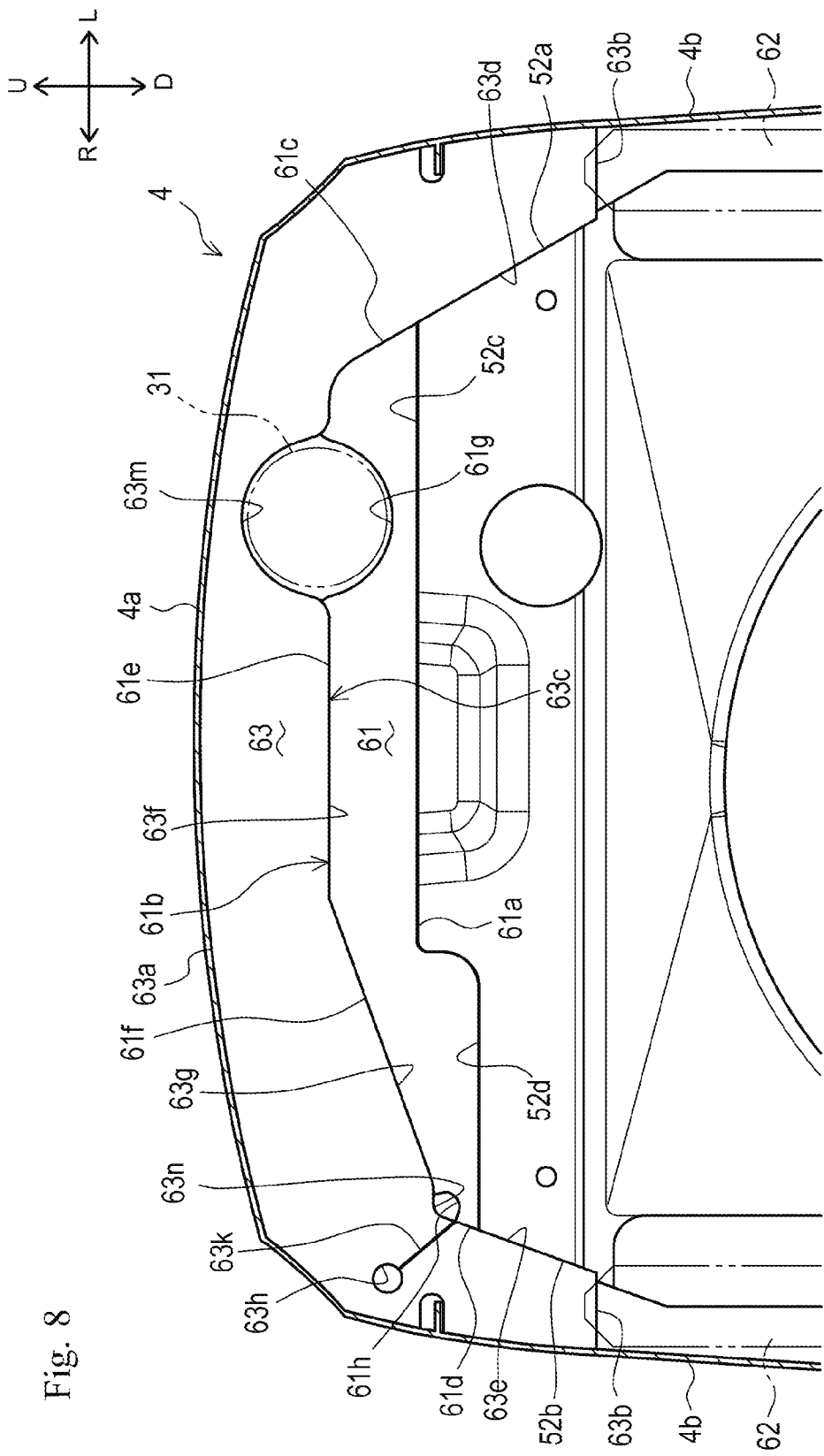
FIG. 8 is a partially sectional front view of the partition member when the hood is closed.

As shown in FIGS. 6 to 8, an upper portion of the shroud 52 is formed in a substantially trapezoidal shape in front view. To put it concretely, at the upper portion of the shroud 52, a shroud left slope 52*a*, a shroud right slope 52*b*, a shroud first upper face 52*c*, and a shroud second upper face 52*d* are mainly formed.

The shroud left slope 52*a* is a face formed at an upper left portion of the shroud 52. The shroud left slope 52*a* is formed to slope upward and inward in the left-right direction (rightward) from a lower side.

The shroud right slope 52*b* is a face formed at an upper right portion of the shroud 52. The shroud right slope 52*b* is formed to slope upward and inward in the left-right direction (leftward) from the lower side.

The shroud first upper face 52*c* is a part of an upper face of the shroud 52. The shroud first upper face 52*c* is formed to extend in the left-right direction (substantially horizontally). The shroud first upper face 52*c* is formed to extend a predetermined length rightward from a left end portion of the upper face of the shroud 52 (to be on a right side of a center in the left-right direction of the shroud 52).

The shroud second upper face 52*d* is a part of the upper face of the shroud 52. The shroud second upper face 52*d* is formed to extend in the left-right direction (substantially horizontally). The shroud second upper face 52*d* is formed to extend a predetermined length leftward from a right end portion of the upper face of the shroud 52 (to a position adjacent to a right end of the shroud first upper face 52*c*). The shroud second upper face 52*d* is formed at a lower position than the shroud first upper face 52*c*.

Thus, the upper portion of the shroud 52 is formed in the substantially trapezoidal shape with a left-right width between the paired left and right sides (the shroud left slope 52*a* and the shroud right slope 52*b*) narrowing from the lower side toward the upper face. An upper base of the trapezoid (the upper face of the shroud 52) is formed in a stepped shape that is higher on a left side (the shroud first upper face 52*c*) than on a right side (the shroud second upper face 52*d*).

As described above, the partition member 60 is disposed in the vicinity of the radiator 50 and partitions the inner space of the hood 4 into the front and rear spaces. The partition member 60 is made of material having elasticity (e.g., elastic resin material such as rubber and sponge). As shown in FIGS. 5 to 8, the partition member 60 mainly includes the lower shield portion 61, the side shield portions 62, and the upper shield portion 63. The lower shield portion 61 is fixed to the radiator 50. The side shield portions 62 and the upper shield portion 63 are fixed to an inner peripheral face of the hood 4. The upper shield portion 63 comes in contact with the lower shield portion 61 and the side shield portions 62 are disposed on left and right opposite sides of the radiator 50 when the hood 4 is closed. The lower shield portion 61, the side shield portions 62, and the upper shield portion 63 fill a clearance between the radiator 50 and the hood 4 and the inner space of the hood 4 is partitioned into the front and rear spaces in the vicinity of the radiator 50. The lower shield portion 61, the side shield portions 62, and the upper shield portion 63 will be concretely described below.

The lower shield portion 61 shown in FIGS. 6 to 8 is a member fixed to the radiator 50. The lower shield portion 61 is formed in a substantially plate shape having a predetermined thickness (a width in a front-back direction). The lower shield portion 61 is formed in a substantially trapezoidal shape with a left-right width between paired left and right sides narrowing from a lower side toward an upper face. To put it concretely, a lower mounting face 61*a* and a lower contact face 61*b* are mainly formed on the lower shield portion 61.

The lower mounting face 61*a* is a face of an outer peripheral face of the lower shield portion 61, oriented substantially downward, and fixed to the shroud 52 of the radiator 50. The lower mounting face 61*a* is formed at a lower portion of the lower shield portion 61. The lower mounting face 61*a* is formed in a shape conforming to (substantially the same shape as) the upper face (the shroud first upper face 52*c* and the shroud second upper face 52*d*) of the shroud 52 in front view. Thus, the lower mounting face 61*a* is formed in a stepped shape that is higher on a left side than on a right side. The lower mounting face 61*a* is formed to have substantially the same left-right width as the upper face (the shroud first upper face 52*c* and the shroud second upper face 52*d*) of the shroud 52. The lower mounting face 61*a* is fixed to the upper face of the shroud 52 by an appropriate method (by use of double-sided tape or the like, for example).

The lower contact face 61*b* is a face of the outer peripheral face of the lower shield portion 61, oriented substantially upward, and capable of coming in contact with the upper shield portion 63 (described later). The lower contact face 61*b* mainly has a lower left slope 61*c*, a lower right slope 61*d*, a lower horizontal upper face 61*e*, and a lower sloping upper face 61*f*.

The lower left slope 61*c* is a face formed on a left portion of the lower shield portion 61. The lower left slope 61*c* is formed to slope upward and inward in the left-right direction (rightward) from a lower side (a left end of the lower mounting face 61*a*). The lower left slope 61*c* is formed to have substantially the same inclination angle as the shroud left slope 52*a*. Thus, the lower left slope 61*c* is disposed along an extended line of the shroud left slope 52*a* (in the same straight line with the shroud left slope 52*a*) in front view.

The lower right slope 61*d* is a face formed on a right portion of the lower shield portion 61. The lower right slope 61*d* is formed to slope upward and inward in the left-right direction (leftward) from a lower side (a right end of the lower mounting face 61*a*). The lower right slope 61*d* is formed to have substantially the same inclination angle as the shroud right slope 52*b*. Thus, the lower right slope 61*d* is disposed along an extended line of the shroud right slope 52*b* (in the same straight line with the shroud right slope 52*b*) in front view.

The lower horizontal face 61*e* is a face formed on an upper left portion of the lower shield portion 61. The lower horizontal upper face 61*e* is formed to extend in the left-right direction (substantially horizontally). A left end of the lower horizontal upper face 61e is formed to be connected to an upper end of the lower left slope 61c. The lower horizontal upper face 61e is formed to extend a predetermined length rightward (to a position slightly displaced leftward from a right end of the shroud first upper face 52c) from the upper end of the lower left slope 61c. A lower first recess 61g is formed in the lower horizontal upper face 61e.

The lower first recess 61g is a portion recessed downward. The lower first recess 61g is formed in the vicinity of the left end portion of the lower horizontal upper face 61e. The lower first recess 61g is formed in a substantially semicircular shape in front view. The lower first recess 61g is formed to have substantially the same radius as the inlet hose 31 (see FIG. 8) of the air cleaner 30.

The lower sloping upper face 61f is a face formed on an upper right portion of the lower shield portion 61. The lower sloping upper face 61f is formed to slope slightly rightward and downward. A left end of the lower sloping upper face 61f is formed to be connected to a right end of the lower horizontal upper face 61e. A right end of the lower sloping upper face 61f is formed to be connected to an upper end of the lower right slope 61d. The lower sloping upper face 61f is formed to have a smaller inclination angle than the lower right slope 61d (to be closer to a horizontal plane). In this manner, the lower sloping upper face 61f is formed to gradually lower rightward from the lower horizontal upper face 61e. Thus, the portion of the upper face of the lower shield portion 61 positioned above the shroud second upper face 52d is formed to be lower than the portion of the upper face of the lower shield portion 61 positioned above the shroud first upper face 52c. In a connection portion between the lower sloping upper face 61f and the lower right slope 61d, the lower second recess 61h is formed.

The lower second recess 61h is a portion recessed leftward and downward. The lower second recess 61h is formed to extend from the right end of the lower sloping upper face 61f to the upper end of the lower right slope 61d.

Figure 5:
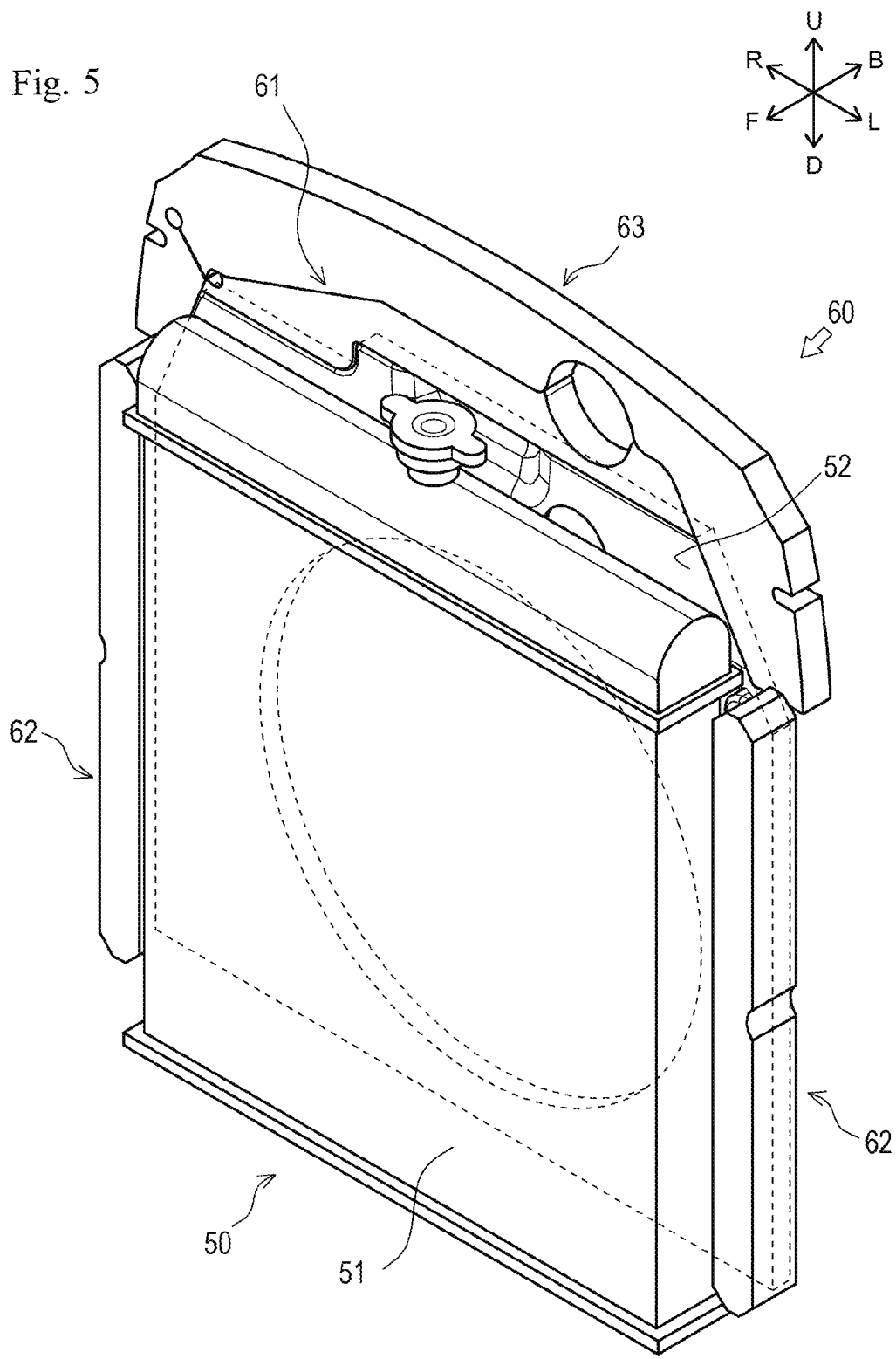
FIG. 5 is a perspective view of a radiator and a partition member.

The side shield portions 62 shown in FIGS. 5, 7, and 8 are members fixed to the hood 4. The side shield portions 62 are formed in substantially plate shapes having predetermined thicknesses (widths in the front-back direction). Each of the side shield portions 62 is formed in a substantially rectangular shape in front view with a longitudinal direction oriented in a vertical direction. The pair of left and right side shield portions 62 is provided. The side shield portions 62 are fixed to insides of the left and right side panels 4b of the hood 4 by an appropriate method (by use of double-sided tape or the like, for example). The side shield portions 62 are disposed on left and right opposite sides of the radiator 50 (the core 51) when the hood 4 is closed (see FIG. 5). The side shield portions 62 are disposed on a front side of the lower shield portion 61 and the upper shield portion 63 (described later) when the hood 4 is closed. Each of the side shield portions 62 is formed to extend from the vicinity of an upper end portion to the vicinity of a lower end portion of the radiator 50.

The upper shield portion 63 shown in FIGS. 6 to 8 is a member fixed to the hood 4. The upper shield portion 63 is formed in a substantially plate shape having a predetermined thickness (a width in the front-back direction). The upper shield portion 63 is formed in such a shape as to be able to come in contact with the lower shield portion 61 and the radiator 50 (the shroud 52) from above. To put it concretely, an upper mounting face 63a, upper bottom faces 63b, and an upper contact face 63c are mainly formed on the upper shield portion 63.

The upper mounting face 63a is a face of an outer peripheral face of the upper shield portion 63, oriented substantially upward and outward in the left-right direction, and fixed to the hood 4. The upper mounting face 63a is formed to extend from a left portion to a right portion via an upper portion of the upper shield portion 63. The upper mounting face 63a is formed in a shape conforming to the inner peripheral face of an upper portion (the top panel 4a and upper portions of the side panels 4b) of the hood 4 in front view. The upper mounting face 63a is fixed to the inner peripheral face of the upper portion of the hood 4 by an appropriate method (by use of double-sided tape or the like, for example).

The upper bottom faces 63b are faces of the outer peripheral face of the upper shield portion 63, oriented substantially downward, and not coming in contact with the lower shield portion 61. The paired left and right upper bottom faces 63b are formed at a lower left portion and a lower right portion of the upper shield portion 63, respectively. The upper bottom faces 63b are formed to extend in the left-right direction (substantially horizontally). The upper bottom faces 63b are formed at positions overlapping with upper end portions of the side shield portions 62 in front view when the hood 4 is closed (see FIG. 8).

The upper contact face 63c is a face of the outer peripheral face of the upper shield portion 63, oriented substantially downward, and capable of coming in contact with the lower shield portion 61 and the radiator 50 (the shroud 52). The upper contact face 63c is formed to extend between the left and right upper bottom faces 63b. The upper contact face 63c is formed in a shape conforming to (substantially the same shape as) the lower contact face 61b of the lower shield portion 61 and the shroud 52 (the shroud left slope 52a and the shroud right slope 52b) in front view. To put it concretely, the upper contact face 63c mainly has an upper left slope 63d, an upper right slope 63e, an upper horizontal lower face 63f, an upper sloping lower face 63g, a through hole 63h, and a slit 63k.

The upper left slope 63d is a face formed in the vicinity of a left end portion of the upper shield portion 63. A lower end of the upper left slope 63d is formed to be connected to a right end of the left upper bottom face 63b. The upper left slope 63d is formed to slope upward and inward in the left-right direction (rightward) from a lower side. The upper left slope 63d is formed to have substantially the same inclination angle as the lower left slope 61c and the shroud left slope 52a.

The upper right slope 63e is a face formed in the vicinity of a right end portion of the upper shield portion 63. A lower end of the upper right slope 63e is formed to be connected to a left end of the right upper bottom face 63b. The upper right slope 63e is formed to slope upward and inward in the left-right direction (leftward) from the lower side. The upper right slope 63e is formed to have substantially the same inclination angle as the lower right slope 61d and the shroud right slope 52.

The upper horizontal lower face 63f is a face formed to be adjacent to the upper left slope 63d. The upper horizontal lower face 63f is formed to extend in the left-right direction (substantially horizontally). A left end of the upper horizontal lower face 63f is formed to be connected to an upper end of the upper left slope 63d. The upper horizontal lower face 63f is formed to extend a predetermined length rightward (to substantially the same position as the right end of the lower horizontal upper face 61e) from the upper end of the upper left slope 63d. An upper first recess 63m is formed in the upper horizontal lower face 63f.

The upper first recess 63*m* is a portion recessed upward. The upper first recess 63*m* is formed in the vicinity of the left end portion of the upper horizontal lower face 63*f* (at a position facing the lower first recess 61*g* from above). The upper first recess 63*m* is formed in a substantially semicircular shape in front view. The upper first recess 63*m* is formed to have substantially the same radius as the inlet hose 31 (see FIG. 8) of the air cleaner 30.

The upper sloping lower face 63*g* is a face formed to be adjacent to the upper right slope 63*e*. The upper sloping lower face 63*g* is formed to slope slightly rightward and downward. A left end of the upper sloping lower face 63*g* is formed to be connected to a right end of the upper horizontal lower face 63*f*. A right end of the upper sloping lower face 63*g* is formed to be connected to an upper end of the upper right slope 63*e*. The upper sloping lower face 63*g* is formed to have a smaller inclination angle than the upper right slope 63*e* (to be closer to the horizontal plane). The upper sloping lower face 63*g* is formed to have substantially the same inclination angle as the lower sloping upper face 61*f*. In a connection portion between the upper sloping lower face 63*g* and the upper right slope 63*e*, an upper second recess 63*n* is formed.

The upper second recess 63*n* is a portion recessed rightward and upward. The upper second recess 63*n* is formed to extend from the right end of the upper sloping lower face 63*g* to the upper end of the upper right slope 63*e*.

The through hole 63*h* is a hole formed to pass through the upper shield portion 63 in the front-back direction. The through hole 63*h* is formed in the right portion of the upper shield portion 63. To put it concretely, the through hole 63*h* is formed at substantially the same position as the connection portion between the right upper bottom face 63*b* and the upper right slope 63*e* in the left-right direction. The through hole 63*h* is formed at substantially the same position as the upper sloping lower face 63*g* in the vertical direction.

The slit 63*k* is a slit formed to connect the upper contact face 63*c* and the through hole 63*h*. The slit 63*k* is formed to extend from the vicinity of the upper end portion of the upper right slope 63*e* to the through hole 63*h*.

The way in which the partition member 60 formed as described above partitions the inner space of the hood 4 into the front and rear spaces will be described below.

When the hood 4 is closed as shown in FIG. 8 from an open state of the hood 4 shown in FIG. 7, the upper shield portion 63 fixed to the hood 4 comes in contact with the lower shield portion 61 and the radiator 50 (the shroud 52) from above. As a result, the vertical clearance between the upper portion of the shroud 52 and the hood 4 is closed with the lower shield portion 61 and the upper shield portion 63.

When the hood 4 is closed, the side shield portions 62 fixed to the hood 4 are positioned on the left and right opposite sides of the radiator 50. As a result, the left and right clearances between left and right side portions of the radiator 50 and the hood 4 are closed with the side shield portions 62.

By closing the clearances around the radiator 50 with the partition member 60 in this manner, the space in the hood 4 is partitioned into the front and rear spaces in the vicinity of the radiator 50. Thus, it is possible to prevent flowing of the air through a periphery of the radiator 50 to thereby increase cooling efficiency of the radiator 50.

In the embodiment, because the partition member 60 for partitioning the inner space of the hood 4 is split into two (the lower shield portion 61 and the upper shield portion 63) above the radiator 50, it is possible to suppress deformation of the partition member 60.

To put it concretely, by forming the lower shield portion 61 and the upper shield portion 63 as the lower and upper split members instead of forming the lower shield portion 61 and the upper shield portion 63 as one member, it is possible to decrease vertical widths of the respective members (the lower shield portion 61 and the upper shield portion 63). For example, by decreasing the vertical width of the lower shield portion 61, it is possible to suppress falling (deformation in a tilting manner) of the lower shield portion 61 when the upper shield portion 63 comes in contact from above. As for the upper shield portion 63, by decreasing the vertical width of the upper shield portion 63, it is similarly possible to suppress falling of the upper shield portion 63 when the lower shield portion 61 comes in contact from below. Thus, it is possible to suppress the deformation, deterioration, and the like of the partition member 60 caused by opening and closing of the hood 4.

In the closed state of the hood 4, a through hole in a substantially circular shape in front view is formed by the lower first recess 61*g* of the lower shield portion 61 and the upper first recess 63*m* of the upper shield portion 63. Through the through hole, the inlet hose 31 of the air cleaner 30 can be disposed to extend astride the radiator 50 in the front-back direction.

In the closed state of the hood 4, a through hole is formed by the lower second recess 61*h* of the lower shield portion 61 and the upper second recess 63*n* of the upper shield portion 63. Through the through hole, an appropriate member (e.g., an air conditioner hose) can be disposed to extend astride the radiator 50 in the front-back direction.

The through hole 63*h* is formed in the upper shield portion 63. Through the through hole 63*h*, an appropriate member (e.g., a harness) can be disposed to extend astride the radiator 50 in the front-back direction. Moreover, it is possible to insert the harness or the like through the through hole 63*h* via the slit 63*k*, which facilitates mounting of the harness or the like.

As described above, the tractor 1 (work vehicle) according to the embodiment includes:

the hood 4 that can be opened and closed;

the lower shield portion 61 (first shield portion) that is fixed to the inside of the hood 4; and the upper shield portion 63 (second shield portion) that is fixed to the inner peripheral face of the hood 4 and, when the hood 4 is closed, comes in contact with the lower shield portion 61 to partition the inner space of the hood 4 together with the lower shield portion 61.

With this structure, it is possible to suppress the deformation of the shield portions (the lower shield portion 61 and the upper shield portion 63). In other words, by splitting the shield portion into two (the lower shield portion 61 and the upper shield portion 63), it is possible to decrease dimensions of the respective shield portions to thereby suppress the deformation under a load from outside and damage resulting from the deformation.

The recesses (the lower first recess 61*g* and the upper first recess 63*m*) through which the inlet hose 31 (hose) connected to the air cleaner 30 is disposed are respectively formed in the lower contact face 61*b* (first contact face) at which the lower shield portion 61 comes in contact with the upper shield portion 63 and the upper contact face 63*c* (second contact face) at which the upper shield portion 63 comes in contact with the lower shield portion 61.

With this structure, it is possible to suppress the deformation of the shield portions (the lower shield portion 61 and the upper shield portion 63). In other words, by forming the recesses through which the inlet hose 31 is disposed in the contact faces of the two shield portions (the lower shield portion 61 and the upper shield portion 63), it is possible to decrease sizes (depths) of the respective recesses to thereby suppress deformation of portions close to the recesses and damage resulting from the deformation. Especially, in the embodiment, the two recesses are respectively formed in the semicircular shapes (shapes of two halves of a circle) and therefore it is possible to suppress the deformation of both the recesses in a balanced manner.

The lower shield portion 61 is fixed to the upper face of the radiator 50 (the shroud 52), the upper face of the radiator 50 (the shroud 52) includes the shroud first upper face 52c (first plane portion) and the shroud second upper face 52d (second plane portion) formed at a lower position than the shroud first upper face 52c, and the recesses (the lower first recess 61g and the upper first recess 63m) are formed above the shroud first upper face 52c.

With this structure, it is possible to suppress the deformation of the lower shield portion 61. In other words, by forming the recesses above the shroud first upper face 52c, it is possible to suppress a height from the upper face of the radiator 50 to the lower first recess 61g of the lower shield portion 61. Thus, it is possible to suppress the deformation of the portion close to the lower first recess 61g of the lower shield portion 61 on which a load is likely to be applied and the damage resulting from the deformation.

The upper face of the lower shield portion 61 has the portion positioned above the shroud second upper face 52d that is lower than the portion positioned above the shroud first upper face 52c.

With this structure, it is possible to suppress the deformation of the lower shield portion 61. In other words, it is possible to suppress the height of the portion of the lower shield portion 61 positioned above the shroud second upper face 52d. Thus, it is possible to suppress the deformation of the lower shield portion 61 and the damage resulting from the deformation.

The lower shield portion 61 is formed in the substantially trapezoidal shape with the left-right width between the paired left and right sides narrowing from the lower side toward the upper face.

With this structure, it is possible to suppress the deformation of the lower shield portion 61. In other words, when the lower portion of the lower shield portion 61 is fixed, by narrowing the left-right width as a distance from the fixed portion increases (toward the upper face), it is possible to make the lower shield portion 61 resistible to deformation to thereby suppress the damage resulting from the deformation.

The lower shield portion 61 is fixed to the upper face of the radiator 50 (the shroud 52), the upper portion of the radiator 50 (the shroud 52) is formed in the substantially trapezoidal shape with the left-right width between the paired left and right sides narrowing from the lower side toward the upper face, and the paired left and right sides of the lower shield portion 61 are formed along the extended lines of the paired left and right sides of the upper portion of the radiator.

With this structure, it is possible to suppress the deformation of the lower shield portion 61. In other words, by forming the lower shield portion 61 in the shape along the extended lines of the shape of the radiator 50 (the shroud 52), it is possible to suppress application of an excessive load on the lower shield portion 61 in opening and closing of the hood 4 (when the lower shield portion 61 comes in contact with the upper shield portion 63).

The lower shield portion 61 according to the embodiment is an embodiment of the first shield portion according to the disclosure.

The upper shield portion 63 according to the embodiment is an embodiment of the second shield portion according to the disclosure.

The lower contact face 61b according to the embodiment is an embodiment of the first contact face according to the disclosure.

The upper contact face 63c according to the embodiment is an embodiment of the second contact face according to the disclosure.

The lower first recess 61g and the upper first recess 63m according to the embodiment are embodiments of the recesses according to the disclosure.

The shroud first upper face 52c according to the embodiment is an embodiment of the first plane portion according to the disclosure.

The shroud second upper face 52d according to the embodiment is an embodiment of the second plane portion according to the disclosure.

Although the embodiment of the disclosure has been described above, the disclosure is not limited to the above-described configuration and can be changed in various ways without departing from a scope of the disclosure described in the claims.

For example, although the work vehicle according to the embodiment is the tractor 1, the type of the work vehicle according to the disclosure is not limited to the tractor 1. The work vehicle according to the disclosure may be other agricultural vehicles, construction vehicles, industrial vehicles, and the like.

The lower shield portion 61 is fixed to the shroud 52 of the radiator 50 in the example shown in the embodiment, which is not necessarily the case in the disclosure. For example, the lower shield portion 61 may be fixed to the core 51 of the radiator 50.

The upper portion of the radiator 50 (the shroud 52) and the lower shield portion 61 are formed in the substantially trapezoidal shapes in front view in the embodiment, which is not necessarily the case in the disclosure. In other words, the lower shield portion 61 and the like may be formed in arbitrary shapes.

The recesses (the lower first recess 61g and the upper first recess 63m) are formed above the shroud first upper face 52c in the embodiment, which is not necessarily the case in the disclosure. In other words, the recesses may be formed at an arbitrary position (e.g., a position corresponding to a position where the inlet hose 31 is disposed).

The recesses (the lower first recess 61g and the upper first recess 63m) through which the inlet hose 31 is disposed are respectively formed in the lower shield portion 61 and the upper shield portion 63 in the embodiment, which is not necessarily the case in the disclosure. For example, a recess may be formed in either one of the lower shield portion 61 and the upper shield portion 63. If the inlet hose 31 need not be disposed astride the partition member 60 in the front-back direction, it is unnecessary to form the recesses.

The partition member 60 disposed above the radiator 50 is split into the lower and upper two portions (the lower shield portion 61 and the upper shield portion 63) in the example shown in the embodiment, which is not necessarily the case in the disclosure. For example, the partition member 60 (e.g., each of the side shield portions 62) disposed on each side of the radiator 50 may be split into left and right two portions with one of the two portions fixed to the radiator 50 and the other fixed to the hood 4.

The lower shield portion 61, the side shield portions 62, and the upper shield portion 63 are shown as examples of the partition member 60 in the embodiment, which is not necessarily the case in the disclosure. In other words, it is possible to appropriately add the partition member 60 in accordance with shapes and the like of the hood 4 and the devices disposed in the hood 4.

What is claimed is:

1. A work vehicle comprising:
   a hood that can be opened and closed;
   a radiator including a main body and a shroud;
   a first shield portion that is fixed to an upper face of the shroud; and
   a second shield portion that is fixed to an inner peripheral face of the hood and, when the hood is closed, comes in contact with the first shield portion to partition an inner space of the hood together with the first shield portion,
   wherein recesses through which a hose connected to an air cleaner is disposed are respectively formed in a first contact face at which the first shield portion comes in contact with the second shield portion and a second contact face at which the second shield portion comes in contact with the first shield portion,
   wherein the upper face of the shroud is an uppermost face of the shroud that extends above the main body of the radiator,
   wherein the upper face of the shroud includes a first plane portion and a second plane portion formed at a lower position than the first plane portion, and
   wherein the recesses are formed above the first plane portion.

2. The work vehicle as claimed in claim 1, wherein
   an upper face of the first shield portion has a portion positioned above the second plane portion that is lower than a portion positioned above the first plane portion.

3. The work vehicle as claimed in claim 2, wherein
   the first shield portion is formed in a substantially trapezoidal shape with a left-right width between paired left and right sides narrowing from a lower side toward the upper face.

4. The work vehicle as claimed in claim 3, wherein
   an upper portion of the shroud is formed in a substantially trapezoidal shape with a left-right width between paired left and right sides narrowing from a lower side toward the upper face, and
   paired left and right sides of the first shield portion are formed along extended lines of the paired left and right sides of the upper portion of the shroud.

5. The work vehicle as claimed in claim 2, wherein
   an upper portion of the shroud is formed in a substantially trapezoidal shape with a left-right width between paired left and right sides narrowing from a lower side toward the upper face, and
   paired left and right sides of the first shield portion are formed along extended lines of the paired left and right sides of the upper portion of the shroud.

6. The work vehicle as claimed in claim 1, wherein
   an upper portion of the shroud is formed in a substantially trapezoidal shape with a left-right width between paired left and right sides narrowing from a lower side toward the upper face, and
   paired left and right sides of the first shield portion are formed along extended lines of the paired left and right sides of the upper portion of the shroud.

7. The work vehicle as claimed in claim 1, wherein
   the first shield portion is formed in a substantially trapezoidal shape with a left-right width between paired left and right sides narrowing from a lower side toward an upper face.

8. The work vehicle as claimed in claim 7, wherein
   an upper portion of the shroud is formed in a substantially trapezoidal shape with a left-right width between paired left and right sides narrowing from a lower side toward the upper face, and
   paired left and right sides of the first shield portion are formed along extended lines of the paired left and right sides of the upper portion of the shroud.

9. The work vehicle as claimed in claim 1, wherein
   the first shield portion is a separate component from the shroud and the second shield portion.

* * * * *